Nov 5, 1929.  E. G. SPENCER-CHURCHILL  1,734,885
KILN
Filed March 1, 1928
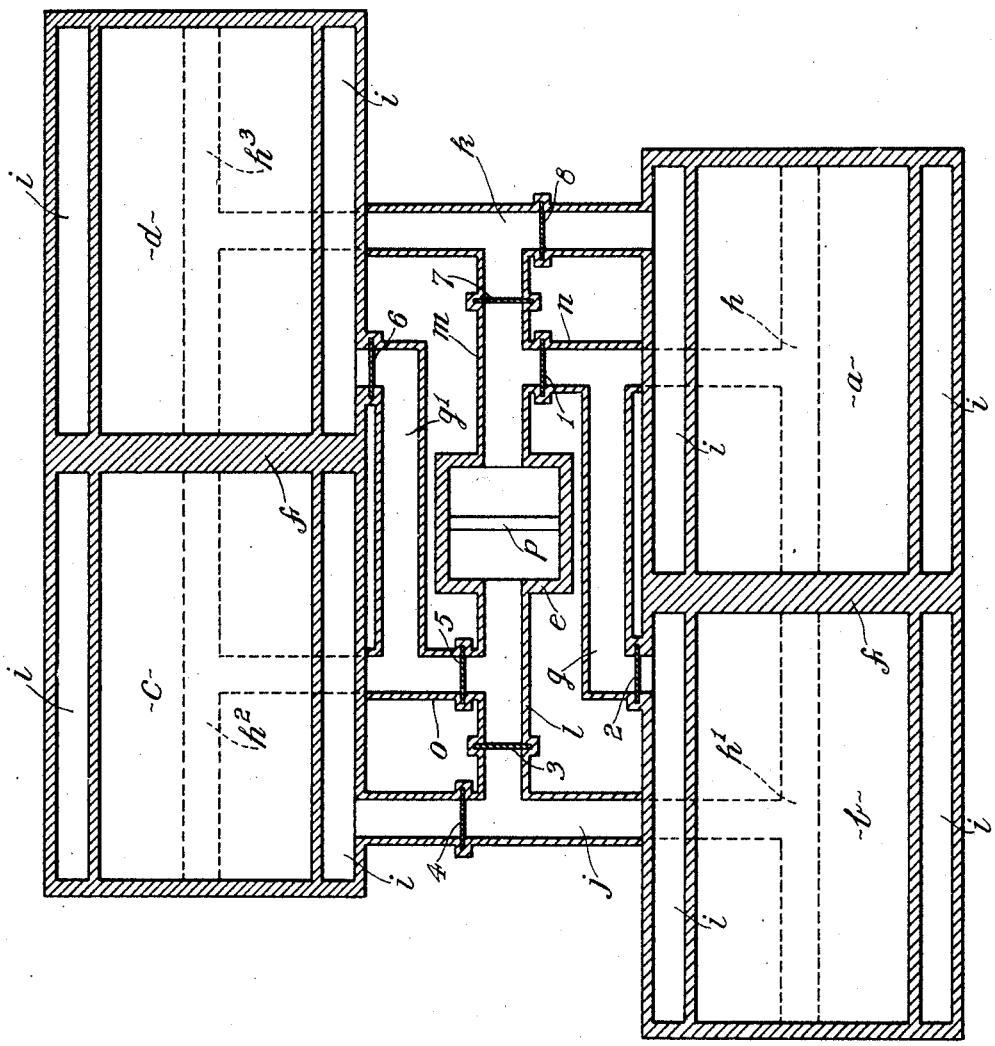

Patented Nov. 5, 1929

1,734,885

UNITED STATES PATENT OFFICE

EDWARD GEORGE SPENCER-CHURCHILL, OF LONDON, ENGLAND

KILN

Application filed March 1, 1928, Serial No. 258,367, and in Great Britain June 29, 1927.

This invention relates to kilns, and has particular reference to kilns of the downdraft type employed for the burning and vitrification of bricks, tiles and ceramic goods.

The invention has for its object to provide an improved construction and arrangement of kilns of the type referred to which permits sequence firing, and ensures more exact control of the volume and type of heated gas passing from the originating furnace. The color and burnt texture of the goods fired can be made according to requirement and reproduction assured, while, by means of this invention, considerable economies in fuel consumption, in time consumed in burning and cooling, and in labor of stoking can be effected.

According to the invention, a group of kilns is connected to a common chimney for the purpose of draught, and the members of the group are provided with interconnecting flues each under independent control which enable hot gases from one kiln to be passed to one or more succeeding kilns.

Reference will now be made to the accompanying drawing which illustrates by way of example a diagrammatic plan of an arrangement in which the kilns are disposed in pairs.

Referring to the drawing, four kilns $a$, $b$, $c$ and $d$ are arranged in pairs about a central and common chimney $e$. The kilns $a$ and $b$ are separated by a common end wall $f$ and are interconnected by an external flue $g$ leading from an open flue $h$ beneath the checker work floor of kiln $a$ to the upper portion of kiln $b$. Side bag chimneys or flues $i$ are built inside the walls of the kilns and the hot gases of combustion pass upwardly through them from a furnace hearth of normal type and descend through the body of the kilns to its floor escaping through the floor checker work to the flue $h$. The flue $h^1$ beneath the checker work floor of the kiln $b$ is connected by a flue $j$ with the kiln $c$ which also has a flue $h^2$ beneath its floor connected by a flue $g^1$ to the kiln $d$. The flue $h^3$ beneath the floor of kiln $d$ is connected by a flue $k$ with the interior of kiln $a$. The flues $j$ and $k$ have branches $l$ and $m$, respectively, leading to the chimney $e$ and these branches are respectively provided with connections $n$ and $o$ leading to the flues $g$ and $g^1$. The passage of gases through all the flues and their connections is controlled by dampers numbered 1 to 8 which are preferably arranged for vertical movement. The chimney is preferably provided with a midfeather $p$ extending from its base to about one sixth of its height for the purpose of preventing gases from passing directly between the branch flues $l$ and $m$.

In starting one kiln, for example, $a$ is fired, dampers 7, 8 and 2 being closed and 1 open. When this kiln is at a dull red heat, or all steam gone, its gases are partially led to the next kiln $b$ and thence to the chimney by opening dampers 2 and 3 and partially closing damper 1, dampers 4 and 5 being closed. When kiln $a$ is finished, damper 1 is closed, and the hot air is passed through kiln $b$ for 2 or 3 days without any expenditure of fuel or labor until kiln $b$ is thoroughly dried and considerably heated. The fires are subsequently lit in this second kiln, and when it reaches a dull red heat, its gases are similarly led to the first kiln $c$ of the adjoining pair, and so on, until a considerable part of the heat in the gas is exhausted before passing to the chimney. The chimney may have induced draught by means of a fan or the gases may be allowed to enter it, at a temperature sufficient to give the necessary uplift. The fire holes and wicket of each kiln are sealed, when necessary, to prevent the chimney from drawing cold air into the kiln which is being dried and warmed. The operation is cyclic in one direction, but the flow of gases can be varied in the case of adjacent kilns by opening dampers (not shown) which may be placed in the dividing walls $f$ and by suitably altering the other dampers in the flues connecting these kilns to the chimney.

By arranging the kilns in the manner above described, the operation of setting, drying, warming, firing, cooling and drawing are rendered cyclic, the heat of the gases being used to the greatest possible extent. It is to be understood, however, that the arrangement shown allows the gases to be diverted to the chimney at any stage, or the gases after passing through all four kilns may be returned, for example, to kiln $a$ when next in succession or led to another kiln or kilns if more than four are employed.

Further, by controlling the air supply to the active kiln furnaces, variations in color effect can be imparted to the goods in the active kiln. This advantage of color control is particularly desirable in sand faced tiles, faced bricks, and red or brown rubbing bricks, and when working with known clays or sand the reproduction of color in a preburnt batch is assured.

I claim:—

1. A construction or arrangement of kilns for burning bricks, tiles and ceramic goods wherein a number of kilns having side bag chimneys through which hot combustion gases from a furnace pass upwardly and then downwardly through the body and floor of the kiln to an outlet communicating with a system of flues interconnecting the kilns with each other and with a common chimney are arranged in pairs about the common chimney, the members of each pair being separated by a common end wall.

2. A construction or arrangement of kilns according to claim 1 comprising two pairs of kilns, each pair being connected by a separate branch flue to the chimney.

In witness whereof I affix my signature.

EDWARD GEORGE SPENCER-CHURCHILL.